United States Patent
Hallal et al.

(10) Patent No.: US 12,331,924 B2
(45) Date of Patent: Jun. 17, 2025

(54) ILLUMINATION APPARATUS

(71) Applicant: AMS-OSRAM ASIA PACIFIC PTE. LTD., Singapore (SG)

(72) Inventors: Bassam Hallal, Thalwil (CH); Alessandro Piotto, Thalwil (CH); Nicolino Stasio, Zurich (CH)

(73) Assignee: AMS-OSRAM ASIA PACIFIC PTE. LTD., Singapore (SG)

( * ) Notice: Subject to any disclaimer, the term of this patent is extended or adjusted under 35 U.S.C. 154(b) by 0 days.

(21) Appl. No.: 18/686,443

(22) PCT Filed: Jul. 15, 2022

(86) PCT No.: PCT/SG2022/050496
§ 371 (c)(1),
(2) Date: Feb. 26, 2024

(87) PCT Pub. No.: WO2023/033718
PCT Pub. Date: Mar. 9, 2023

(65) Prior Publication Data
US 2025/0122989 A1    Apr. 17, 2025

(30) Foreign Application Priority Data
Aug. 30, 2021    (GB) .................................... 2112352

(51) Int. Cl.
*F21V 5/00*    (2018.01)
*G02B 27/09*    (2006.01)
(Continued)

(52) U.S. Cl.
CPC .............. *F21V 5/007* (2013.01); *F21V 5/004* (2013.01); *G02B 27/0922* (2013.01); *F21Y 2105/16* (2016.08); *F21Y 2115/30* (2016.08)

(58) Field of Classification Search
CPC .................................. F21V 5/004; F21V 5/007
See application file for complete search history.

(56) References Cited

U.S. PATENT DOCUMENTS 11,085,609 B1 *  8/2021  Cheng .................. G01S 7/4815
11,092,719 B1     8/2021  Zhu
(Continued)

FOREIGN PATENT DOCUMENTS

| EP | 3250882 A1 | 12/2017 |
| WO | 2020222704 A1 | 11/2020 |
| WO | 2021107465 A1 | 6/2021 |

OTHER PUBLICATIONS

Search Report of corresponding British Patent Application No. 2112352.6, dated Jun. 10, 2022, 3 pages (for informational purposes only).

(Continued)

*Primary Examiner* — Sean P Gramling
(74) *Attorney, Agent, or Firm* — VIERING, JENTSCHURA & PARTNER mbB; Robert M Bilotta, Jr.

(57) ABSTRACT

An illumination apparatus includes a periodic microlens array (MLA) including microlenses arranged with a first pitch d1 in a first direction. The illumination apparatus also includes a first set of first radiation-emitting elements arranged with a second pitch d2 being an integer multiple of the first pitch d1 and configured to generate, in cooperation with the MLA, a structured light pattern. The illumination apparatus also includes a second set of second radiation-emitting elements arranged with a third pitch d3 being a non-integer multiple of the first pitch d1 in at least the first direction and configured to generate, in cooperation with the MLA, a pattern of lines or a beam for flood illumination.

15 Claims, 11 Drawing Sheets

(51) Int. Cl.
  *F21Y 105/16*    (2016.01)
  *F21Y 115/30*    (2016.01)

(56) References Cited

U.S. PATENT DOCUMENTS

| | | |
|---|---|---|
| 2016/0197452 A1 | 7/2016 | Mor |
| 2019/0049097 A1 | 2/2019 | Rossi et al. |
| 2020/0096171 A1 | 3/2020 | Han et al. |
| 2023/0020189 A1 | 1/2023 | Park et al. |

OTHER PUBLICATIONS

International Search Report issued for the corresponding PCT patent application No. PCT/SG2022/050496, dated Feb. 21, 2023, 6 pages (For informational purposes only).

\* cited by examiner

ILLUMINATION APPARATUS

CROSS-REFERENCE TO RELATED APPLICATIONS

The present application is a U.S. National Stage Application of International Application PCT/SG2022/050496, filed Jul. 15, 2022, and claims the priority of the United Kingdom Patent Application GB 2112352.6, filed Aug. 30, 2021; the entire disclosures of the above-listed applications are hereby explicitly incorporated by reference.

FIELD

The present disclosure relates to the field of illumination apparatuses for use in depth mapping applications, and relates in particular to an illumination apparatus for generating a pattern of lines or a beam for flood illumination, and for generating structured light patterns, such as dot patterns.

BACKGROUND

Depth mapping of a scene, also known as 3-dimensional (3D) mapping, is commonly employed by electronic devices, for example smartphones, tablet devices, games consoles and laptop computers.

In some examples, depth mapping of a scene may be used for security purposes, such as to enable access to a resource on an electronic device or unlock the electronic device based on 3D facial recognition. In some examples, electronic devices may also comprise image-sensing devices such as cameras, wherein a depth-map of a scene may be used to improve image-capturing capabilities of the image-sensing devices.

Several techniques for depth mapping are known. For example, stereo-vision cameras may be employed to determine a depth map of a scene based upon disparities between images captured by a plurality of cameras. Some depth mapping techniques may include illumination of a scene, wherein characteristics of the illumination may be used to determine a depth-map of the scene.

In some examples, structured light, e.g. a light pattern, may be used. Therein, structured light may be projected onto a scene and a pattern created in the scene by the projected structured light makes it possible to distinguish features of the scene according to their distance from the structured light-emitting apparatus. That is, an image of the structured light as projected onto a scene may be compared to a reference pattern, and disparities between the image and the reference pattern may be used to determine a depth map of the scene.

In some examples, a general illumination of the scene may also be required. In contrast to structured light illuminators, flood illuminators are known to provide a generally uniform illumination of a scene.

In some examples, a flood illuminator may be used to illuminate a scene and detect presence of an object, such as a person, in front of a sensor, and a structured light illuminator may be used to illuminate a scene with a unique dot pattern, thereby enabling a 3D reconstruction of the scene.

However, implementations of both flood illuminators and structured light illuminators in an electronic device may increase an overall cost, complexity and size of the device. Furthermore, recent trends in electronic device design, and in particular in the design of portable devices such as smartphones, are towards increased levels of miniaturization and decreased overall cost.

It is therefore also desirable to provide a 3D mapping solution that is suitable for use in electronic devices such as smartphones, smart-watches, tablet devices, games consoles and laptop computers, wherein the solution does not substantially increase a cost, complexity and/or size of the electronic device.

It is therefore an aim of at least one embodiment of at least one aspect of the present disclosure to obviate or at least mitigate at least one of the above identified shortcomings of the prior art.

An example of related art is EP 3,250,882 B1 (Rossi et al.), which describes apparatus for the generation of structured light and patterned illumination.

SUMMARY

The present disclosure relates to the field of illumination apparatuses for use in depth mapping applications, and relates in particular to an illumination apparatus for generating a pattern of lines or a beam for flood illumination, and for generating structured light patterns.

According to a first aspect of the disclosure, there is provided an illumination apparatus comprising: a periodic microlens array (MLA) comprising microlenses arranged with a first pitch d1 in a first direction; a first set of first radiation-emitting elements arranged with a second pitch d2 being an integer multiple of the first pitch d1 and configured to generate, in cooperation with the MLA, a structured light pattern; and a second set of second radiation-emitting elements arranged with a third pitch d3 being a non-integer multiple of the first pitch d1 in at least the first direction and configured to generate, in cooperation with the MLA, a pattern of lines or a beam for flood illumination.

By integrating both the first set of first radiation-emitting elements for generating the structured light pattern and the second set of second radiation-emitting elements for generating the pattern of lines or a beam for flood illumination into a single apparatus, e.g. a single package, an overall size of the illumination apparatus may be reduced relative to prior art solutions that implement discrete flood illuminators and structured light pattern illuminators.

By reducing an overall size of the apparatus, a materials cost associated with manufacturing the apparatus may be reduced. Furthermore, a footprint required for the apparatus, e.g. a footprint on a printed circuit board, may also be reduced, thereby reducing an overall system costs.

By implementing only a single MLA for generation of both a structured light pattern and a pattern of lines or a beam for flood illumination, a complexity of the apparatus may be reduced, and thereby assembly costs and times may be reduced accordingly.

Furthermore, by having only a single MLA for generation of both a structured light pattern and a pattern of lines or a beam for flood illumination, design tolerance control may be improved. That is, by integrating line or flood illumination and structured light illumination functionality into a single apparatus, requirements for precise relative location of discrete components for discrete line or flood illuminators and structured light pattern illuminators are mitigated.

The disclosed apparatus may be implemented on electronic devices, for example smartphones, wherein only a single aperture is required in a housing of the electronic device for both structured light and flood illumination, compared to prior art devices which may require two apertures. Furthermore, a size of an aperture required for the disclosed illumination apparatus would be smaller than a total size of two apertures required in prior art electronic devices.

By having the plurality of second set of second radiation-emitting elements arranged with a third pitch being a non-integer multiple of a pitch of the MLA in at least a first direction, the second set of second radiation-emitting elements may be configured to avoid matching a periodicity of the periodically arranged microlenses in the first direction. As such, a generate beam may be suitable for flood illumination, or for generating a pattern of lines, as will be described in more detail below.

The microlenses of the periodic MLA may be arranged with the first pitch d1 in a second direction orthogonal to the first direction, e.g. as a regular grid-array.

The third pitch d3 may be defined by the equation:

$$d3 = d1(n +/- 1)/n \qquad \text{Equation (1)}$$

wherein 'n' corresponds to an amount of radiation-emitting elements in the second set of second radiation-emitting elements in the first direction.

This may result in multiple projected dot grids, shifted by L/[(n+/-1)/n] in at least the first direction, wherein L corresponds to a period of a basic dot pattern. The multiple projected dot grids may form either a flood effect or lines, as described below.

The second set of second radiation-emitting elements may be arranged with a fourth pitch d4 being an integer multiple of the first pitch d1 in a second direction orthogonal to the first direction, and configured to generate, in cooperation with the MLA, the pattern of lines.

The second set of second radiation-emitting elements may be arranged with a fourth pitch d4 being a non-integer multiple of the first pitch d1 in a second direction orthogonal to the first direction, and configured to generate, in cooperation with the MLA, the beam for flood illumination.

The fourth pitch d4 may be defined by the equation:

$$d4 = d1(m +/- 1)/m \qquad \text{Equation (2)}$$

wherein 'm' corresponds to an amount of radiation-emitting elements in the second set of second radiation-emitting elements in the second direction.

This may result in multiple projected dot grids, shifted by L/[(m+/-1)/m] in the second direction.

In some embodiments, the second set of second radiation-emitting elements are provided as a square array, i.e. m=n.

The illumination apparatus may comprise a third set of radiation-emitting elements arranged with a fifth pitch d5 being an integer multiple of the first pitch d1 and configured to generate, in cooperation with the MLA, a structured light pattern. The radiation emitting elements of the first set may be aligned with a grid having the first pitch d1. The radiation emitting elements of the third set may be offset from the grid.

Each of the radiation-emitting elements in the first set generate a same first pattern, and each of the radiation-emitting elements in the third set generate a same second pattern. As such, a high contrast pattern may be generated comprising a relatively large amount of dots.

The radiation emitting elements of the third set may be offset from the grid by a distance corresponding to half of the first pitch d1.

A high contrast pattern may be generated, wherein the pattern comprises evenly distributed dots. Furthermore, the pattern comprises twice as many dots as would be generated with only the first set or third set of radiation emitting elements alone.

The first set of first radiation-emitting elements are provided as an array rotated at an angle θ relative to the MLA, wherein the angle is one of: 16.3°; 22.6°; 28.1°; 36.7°; 43.6°; 46.4°; 53.3°; 61.9°; 67.4° or 73.7°.

By rotating the first set of first radiation-emitting elements at any of the described angles, a high contrast dot pattern comprising an amount of dots corresponding to an integer multiple of the amount of radiation-emitting elements in the first set of first radiation-emitting elements may be generated. Examples of specific integer multiples associated with particular angles are defined in Table 1 below, and can be defined by Equations 3 and 4.

The first set of first radiation-emitting elements may be provided as an array rotated at an angle θ relative to the MLA, wherein the angle θ is defined by:

$$\theta = \tan^{-1}(B/A) \qquad \text{Equation (3)}$$

wherein:

$$A^2 + B^2 = (X-1)^2 \qquad \text{Equation (4)}$$

and wherein A, B and X are integers.

By rotating the first set of first radiation-emitting elements at an angle as described by the above equation, a high contrast dot pattern comprising an amount of dots corresponding to an integer multiple of the amount of radiation-emitting elements in the first set of first radiation-emitting elements may be generated. The specific integer multiple is defined by X−1 and some examples are provided in Table 1 below. Further example are described below with reference to FIG. 5.

The first set of first radiation-emitting elements may be arranged as an n×n square array rotated at a non-90 degree angle θ relative to the MLA, and configured to generate, in cooperation with the MLA, a structured light pattern comprising dots grouped to form a pattern of squares.

A number of dots in a projected pattern may be substantially increased by a slight rotation of the first set of first radiation-emitting elements relative to the MLA.

The first set of first radiation-emitting elements may be arranged as an 'm×n' square array rotated at a non-90 degree angle θ relative to the MLA, and configured to generate, in cooperation with the MLA, a structured light pattern comprising dots grouped to form a pattern of rectangles.

Dots grouped to form particular shapes, e.g. squares or rectangles, may be generated by a combination of: selection of particular dimensions of the first set of first radiation-emitting elements, e.g. an 'n×n' or 'm×n' array; and also by selection of an angle or rotation of the first set of first radiation-emitting elements relative to the MLA.

The angle θ may be less than 5 degrees.

A generally shallow angle of 5 degrees or less may result in groups of patterns of dots, wherein the dots in each group are sufficiently close to one another to substantially form shapes, such as the above-described squares or rectangles.

The first set of first radiation-emitting elements and the second set of second radiation-emitting elements may be interlaced as a single array of radiation-emitting elements on a substrate.

The first set of first radiation-emitting elements and the second set of second radiation-emitting elements may be provided as a monolithic device. That is, the first set of first radiation-emitting elements and the second set of second radiation-emitting elements may be provided as an array of radiation-emitting elements on a single substrate, e.g. a silicon substrate.

In embodiments comprising the third set of radiation-emitting elements, the third set of radiation-emitting elements may also be interlaced with the first set of first radiation-emitting elements and the second set of second radiation-emitting elements as a single array of radiation-emitting elements on a substrate.

A single array of radiation-emitting elements may be used to generate both a structured light pattern and a pattern of lines or a beam for flood illumination, thus reducing size and costs of the illumination apparatus relative to an apparatus requiring discrete arrays of radiation-emitting elements for each of a structured light pattern and a pattern of lines or a beam for flood illumination.

The first set of first radiation-emitting elements and the second set of second radiation-emitting elements may be configured to be enabled independently.

The illumination apparatus may be configured to project a pattern of lines or a beam for flood illumination independently of projecting a structured light pattern. Similarly, the illumination apparatus may be configured to simultaneously project the pattern of lines or the beam for flood illumination and the structured light pattern.

In embodiments comprising the third set of radiation-emitting elements, the third set of radiation-emitting elements may be configured to be enabled with the second set of second radiation-emitting elements.

Each radiation-emitting element may be a Vertical Cavity Surface Emitting Laser (VCSEL).

In some embodiments, each radiation-emitting element may be configured to emit infrared radiation.

The first and second set of second radiation-emitting elements may be at a distance D1 from the MLA, wherein:

$$P1^2 = 2*L1*D1/N1 \qquad \text{Equation (5)}$$

and wherein N1 is an integer and L1 is a wavelength of radiation emitted by the radiation-emitting elements, and P1 is the pitch. All of the radiation-emitting elements of the illumination apparatus, e.g. including any third set if implemented, may be at the distance D1 from the MLA.

The illumination apparatus may be provided in combination with a housing to define a device. The device may be, for example, any of: a smartphone; a tablet device; a communications device; a personal computer; a wearable electronic device; an e-lock device; a security device; a biometric identification device; or a gaming device.

The housing may enclose the illumination apparatus. The illumination apparatus may be configured to emit the structured light pattern and the beam for flood illumination through a single aperture or window in the housing.

Such a housing may be simpler and cheaper to manufacture, and generally more aesthetically pleasing to a user.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF THE DRAWINGS

These and other aspects of the present disclosure will now be described, by way of example only, with reference to the accompanying drawings, wherein.

DETAILED DESCRIPTION

Figure 1:
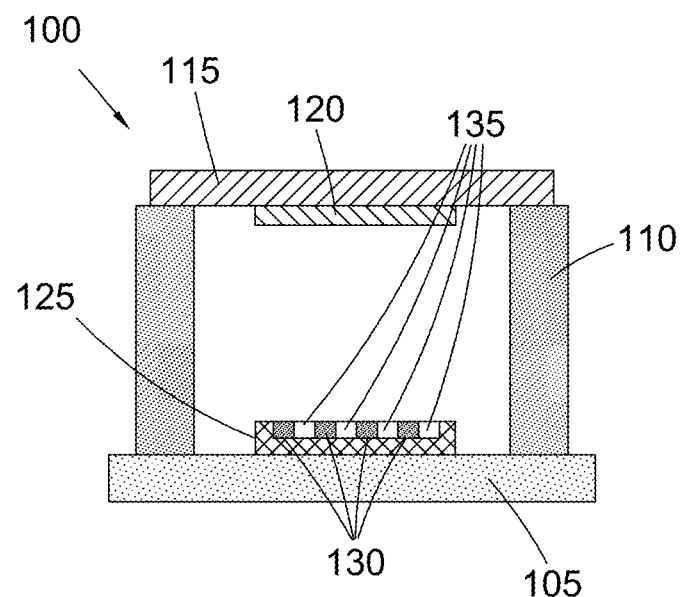
FIG. 1 depicts a block diagram of a cross section of illumination apparatuses, according to embodiments of the disclosure.
Figure 1:
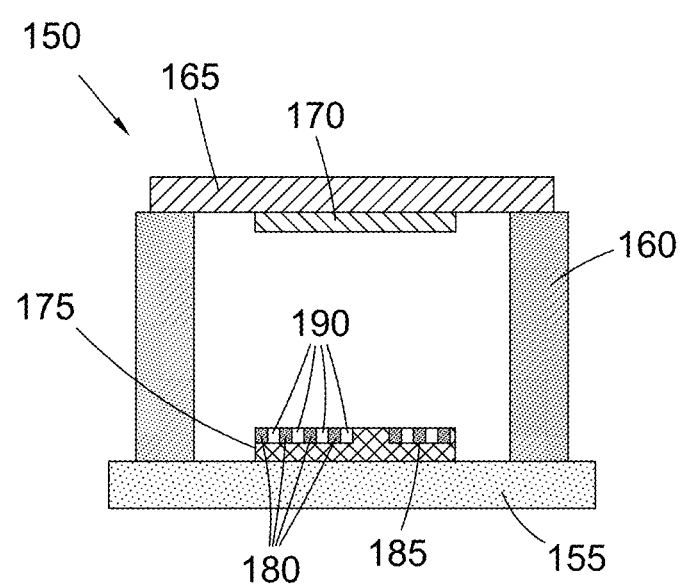

FIG. 1 depicts a block diagram of a cross section of an illumination apparatus 100 according to an embodiment of the disclosure.

The illumination apparatus 100 comprises a first substrate 105. The substrate 105 may, for example, be a PCB substrate or a silicon substrate.

The illumination apparatus 100 also comprises a spacer 110. The spacer 110 is mounted on the first substrate 105. The spacer 110 holds a second substrate 115 at a defined distance from the first substrate 105. The second substrate may be, for example, a glass substrate.

A periodic microlens array (MLA) 120 is provided on the second substrate 115. The MLA 120 may, for example, be formed by a process of replication, nano-imprinting, or by otherwise depositing or adhering the MLA 120 to the second substrate 115. The periodic MLA comprises microlenses arranged with a first pitch d1, as will be described in more detail below.

A third substrate 125 is mounted on the first substrate 105. A first set of first radiation-emitting elements 130 is formed on the third substrate 125. In some embodiments, the first set of first radiation-emitting elements 130 are VCSELs. The first set of first radiation-emitting elements 130 may be arranged as a regular array of radiation-emitting elements 130, e.g. arranged on a grid pattern. The first set of first radiation-emitting elements 130 is arranged with a second pitch d2 being an integer multiple of the first pitch d1 and configured to generate, in cooperation with the MLA, a structured light pattern. The first set of first radiation-emitting elements 130 will be described in more detail below, in particular with reference to FIGS. 4 to 8.

The term 'structured light pattern' will be understood to include a pattern of dots, of various shapes, sizes and orientations, as described below. References herein to a 'dot pattern' will be understood to refer to a 'structured light pattern'.

A second set of second radiation-emitting elements 135 is also formed on the third substrate 125. In some embodiments, the second set of second radiation-emitting elements 135 are VCSELs. The second set of second radiation-emitting elements 135 is arranged with a third pitch d3 being a non-integer multiple of the first pitch d1 in at least a first direction and configured to generate, in cooperation with the MLA, a pattern of lines or a beam for flood illumination. The second set of second radiation-emitting elements 135 may be arranged as a regular array of radiation-emitting elements 135, e.g. arranged on a grid pattern. The second set of second radiation-emitting elements 135 will be described in more detail below, in particular with reference to FIGS. 9 to 11.

The second substrate 115 is transparent to wavelengths of radiation emitted by the first set of first radiation-emitting elements 130 and the second set of second radiation-emitting elements 135.

For purposes of example only, the first set of first radiation-emitting elements 130 and the second set of second radiation-emitting elements 135 are depicted as interlaced as a single array of radiation-emitting elements 130, 135 on the third substrate 125. In embodiments falling within the scope of the disclosure, the first set of first radiation-emitting elements 130 and the second set of second radiation-emitting elements 135 may be provided on separate substrates. In further embodiments, the first set of first radiation-emitting elements 130 and the second set of second radiation-emitting elements 135 may be provided adjacent one another on a single substrate, or partially interlaced on a single substrate.

In some embodiments, the first set of first radiation-emitting elements 130 and the second set of second radiation-emitting elements 135 may be independently enabled, e.g. configured to emit radiation.

For purposes of example only, FIG. 1 depicts each of the first set of first radiation-emitting elements 130 and the second set of second radiation-emitting elements 135 as comprising only four elements each. It will be appreciated that each set may comprise fewer than four radiation-emitting elements and, in some embodiments, substantially more than four radiation-emitting elements.

FIG. 1 also depicts a block diagram of a cross section of an illumination apparatus 150 according to a further embodiment of the disclosure. Many of the features of the illumination apparatus 150 are the same as those the illumination apparatus 100, and therefore are not described in detail.

The illumination apparatus 150 comprises a first substrate 155.

The illumination apparatus 150 also comprises a spacer 160. The spacer 160 is mounted on the first substrate 155. The spacer 160 holds a second substrate 165 at a defined distance from the first substrate 155.

A periodic MLA 170 is provided on the second substrate 165. The periodic MLA 170 comprises microlenses arranged with a first pitch d1, as will be described in more detail below.

A third substrate 175 is mounted on the first substrate 155. A first set of first radiation-emitting elements 180 is formed on the third substrate 175. The first set of first radiation-emitting elements 180 may be arranged as a regular array of radiation-emitting elements 180, e.g. arranged on a grid pattern. The first set of first radiation-emitting elements 180 is arranged with a second pitch d2 being an integer multiple of the first pitch d1 and configured to generate, in cooperation with the MLA, a structured light pattern. The first set of first radiation-emitting elements 180 will be described in more detail below, in particular with reference to FIG. 4.

A second set of second radiation-emitting elements 185 is also formed on the third substrate 175. In this embodiment, the second set of second radiation-emitting elements 185 is provided as an array that is separate from an array formed form the first set of first radiation-emitting elements 180. Furthermore, although the first and second sets of radiation-emitting elements 180, 185 are provided as separate arrays on the substrate 175, in yet further embodiments each array may be provided on a separate substrate.

The second set of second radiation-emitting elements 185 is arranged with a third pitch d3 being a non-integer multiple of the first pitch d1 in at least a first direction and configured to generate, in cooperation with the MLA, a pattern of lines or a beam for flood illumination. The second set of second radiation-emitting elements 185 will be described in more detail below, in particular with reference to FIGS. 9 to 12.

In some embodiments, second set of second radiation-emitting elements 185 is arranged with a fourth pitch d4 being an integer multiple of the first pitch d1 in a second direction orthogonal to the first direction, and configured to generate, in cooperation with the MLA, the pattern of lines. This is described in more detail below with reference to FIGS. 11 and 12.

In some embodiments, second set of second radiation-emitting elements 185 is arranged with a fourth pitch d4 being a non-integer multiple of the first pitch d1 in a second direction orthogonal to the first direction, and configured to generate, in cooperation with the MLA, the beam for flood illumination. In some embodiments, the fourth pitch d4 is the same as the third pitch d3. This is described in more detail below with reference to FIG. 9.

For purposes of example, the further embodiment of FIG. 1 also depicts a third set of radiation-emitting elements 190. In some embodiments, the third set of radiation-emitting elements 190 are VCSELs. The third set of radiation-emitting elements 190 is arranged with a fifth pitch d5 being an integer multiple of the first pitch d1 and configured to generate, in cooperation with the MLA, a structured light pattern. The third set of radiation-emitting elements 190 may be arranged as a regular array of radiation-emitting elements, e.g. arranged on a grid pattern. The third set of radiation-emitting elements 190 may be offset from the first set of first radiation-emitting elements 180, as described in more detail with reference to FIGS. 3 and 4. In some embodiment, the fifth pitch d5 is the same as the second pitch d2.

In the example embodiment of FIG. 1, the first set of first radiation-emitting elements 180 and the third set of radiation-emitting elements 190 are provided as an array of interlaced radiation-emitting elements.

Figure 2:
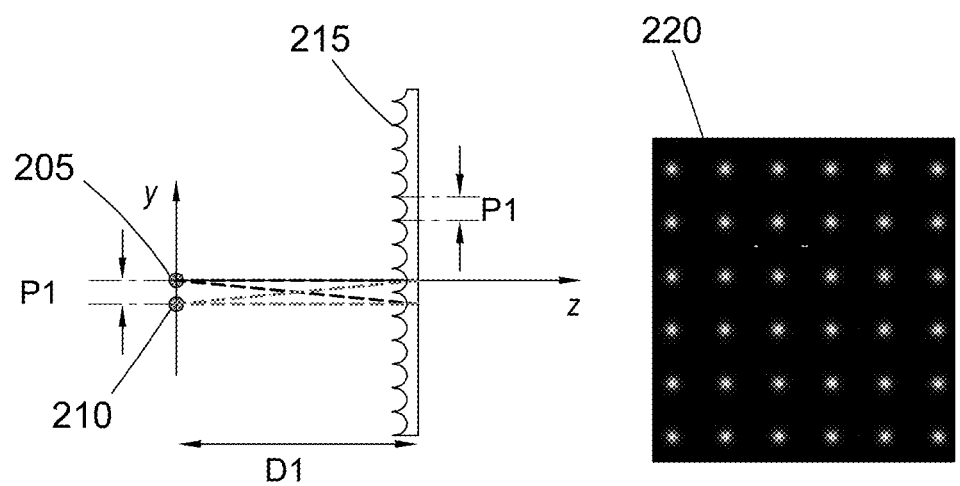
FIG. 2 depicts a configuration of radiation-emitting elements and an MLA exemplifying a principle of operation of embodiments of the disclosure.

FIG. 2 depicts a first configuration of radiation-emitting elements 205, 210 and an MLA 215 exemplifying a principle of operation of embodiments of the disclosure.

A first radiation-emitting element 205 emits radiation that is incident upon the MLA 215 to generate a dot pattern 220. That is, a single first radiation-emitting element 205 generates the entire dot pattern 220 depicted in FIG. 2.

A second radiation-emitting element 210 also emits radiation that is incident upon the MLA 215. The second radiation-emitting element 210 is separated from the first radiation-emitting element 210 by a pitch P1. The microlenses of the MLA 215 are also separated by the pitch P1. That is, a pitch P1 of the MLA 215 matches the pitch P1 of the radiation-emitting elements 205, 210.

A distance D1 between the radiation-emitting elements 205, 210 and the MLA 215 is defined by Equation (5), where N1 is an integer and L1 is a wavelength of radiation emitted by the radiation-emitting elements 205, 210.

If an angle between the second radiation-emitting element 210 and an optical axis of a microlens of the MLA 215 in front of the second radiation-emitting element 210 is equal to a diffraction angle of the MLA 215, a second dot pattern is generated that overlaps the first dot pattern 220. As such, a plurality of radiation-emitting elements separated by a pitch corresponding to a pitch of an MLA and at a distance from the MLA defined by Equation (5) may provide a high contrast dot pattern.

Figure 3:
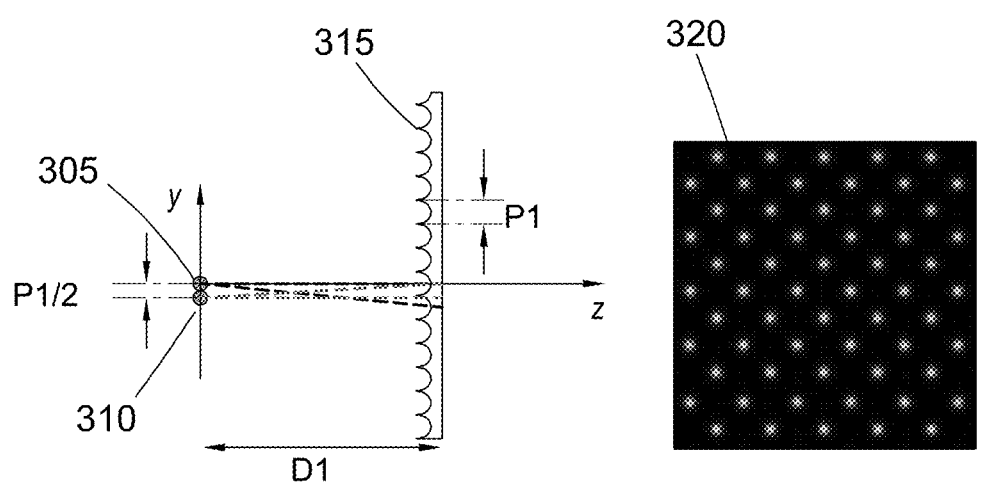
FIG. 3 depicts a further configuration of radiation-emitting elements and an MLA exemplifying a principle of operation of embodiments of the disclosure.

FIG. 3 depicts a further configuration of radiation-emitting elements 305, 310 and an MLA 315 exemplifying a principle of operation of embodiments of the disclosure.

A first radiation-emitting element 305 emits radiation that is incident upon the MLA 315 to generate a portion of dot pattern 320. The single first radiation-emitting element 305 generates every second dot of the pattern 320 depicted in FIG. 3.

A second radiation-emitting element 310 also emits radiation that is incident upon the MLA 315. The microlenses of the MLA 315 are separated by a pitch P1. The second radiation-emitting element 310 is separated from the first radiation-emitting element 310 by a pitch (P1)/2 e.g. half of the pitch P1. A distance D1 between the radiation-emitting elements 305, 310 and the MLA 215 is defined by Equation (5). For simplicity, although examples may be given when N1=2, such conditions may be met when N1~=2.

In this example, an angle between the second radiation-emitting element 310 and an optical axis of a microlens of the MLA 315 in front of the second radiation-emitting element 310 is not equal to a diffraction angle of the MLA 315, a second dot pattern is generated that does not overlap the first dot pattern. That is, each of the first and the second radiation-emitting elements 305, 310 generates half of the dots of the dot pattern 320 depicted in FIG. 3.

As such, a plurality of radiation-emitting elements separated by a pitch (P1)/2 corresponding to half of the pitch P1 of the MLA 315 and at a distance from the MLA defined by Equation (5) may provide a dot pattern comprising twice as many dots as there are microlenses in the MLA 315.

Figure 4:
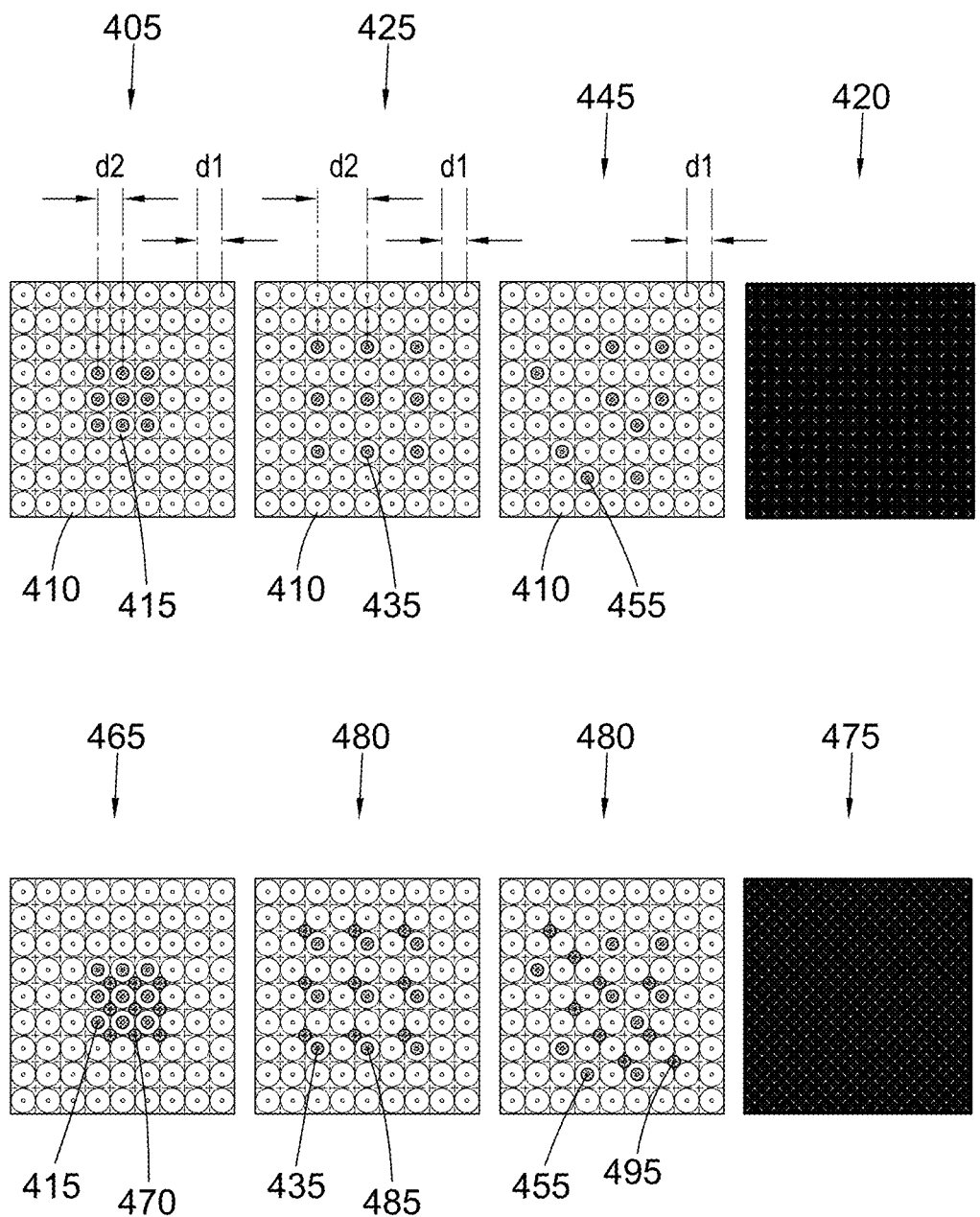
FIG. 4 depicts various arrangements of radiation-emitting elements relative to a microlens array, and resultant structured light patterns, in accordance with embodiments of an the disclosure.

FIG. 4 depicts various arrangements of radiation-emitting elements relative to a microlens array, and resultant structured light patterns, in accordance with embodiments of the disclosure.

In a first arrangement 405, a periodic MLA 410 comprising microlenses arranged with a first pitch d1 is provided. For purposes of example only the MLA 410 is a 9×9 array of microlenses.

A first set of first radiation-emitting elements 415 is arranged with a second pitch d2 being an integer multiple of the first pitch d1 and configured to generate, in cooperation with the MLA, a structured light pattern 420. In the first arrangement 405, the first pitch d1 equals the second pitch d2. That is, the first set of first radiation-emitting elements 415 are provided as an array with a pitch d2 that matches a pitch d1 of the MLA 410.

As described above with reference to FIG. 2, each radiation-emitting element of the first set of first radiation-emitting elements 415 produces the structured light pattern 420, wherein the patterns overlap to provide a high contrast dot pattern.

The first arrangement 405 may correspond to the arrangement of the first set of first radiation-emitting elements 130, 180 and the MLA 120, 170 of the embodiments described with reference to FIG. 1.

In a second arrangement 425, a periodic MLA 430 comprising microlenses arranged with a first pitch d1 is provided. Again, for purposes of example only, in the example of FIG. 4, the MLA 430 is a 9×9 array of microlenses.

In this example embodiment, a first set of first radiation-emitting elements 435 arranged with a second pitch d2 being an integer multiple of the first pitch d1 and configured to generate, in cooperation with the MLA, the structured light pattern 420. In the second arrangement 425, the first pitch d1 is twice the second pitch d2. That is, the first set of first radiation-emitting elements 415 are provided as an array with a pitch d2 that it twice that of the pitch d1 of the MLA 430.

As described above with reference to FIG. 2, each radiation-emitting element of the first set of first radiation-emitting elements 435 produces the structured light pattern 420, wherein the patterns overlap to provide a high contrast dot pattern.

The second arrangement 425 may correspond to the arrangement of the first set of radiation-emitting first elements 130 and the MLA 120 of the embodiment described with reference to FIG. 1.

In a third arrangement 445, a periodic MLA 450 comprising microlenses arranged with a first pitch d1 is provided. Again, for purposes of example only, in the example of FIG. 4, the MLA 450 is a 9×9 array of microlenses.

In this example embodiment, a first set of first radiation-emitting elements 455 is arranged such that each radiation-emitting element is aligned with a grid defined by the MLA 430. Thus, as described above with reference to FIG. 2, each radiation-emitting element of the first set of first radiation-emitting elements 455 produces the structured light pattern 420, wherein the patterns overlap to provide a high contrast dot pattern.

That is, it is not necessary for the first set of first radiation-emitting elements 435 to be arranged as a periodic array to produce the overlapping dot patterns and instead it is only necessary that the radiation-emitting elements 435 are aligned with the grid defined by the MLA 430.

The third arrangement 445 may be correspond to the arrangement of the first set of first radiation-emitting elements 130 and the MLA 120 of the embodiment described with reference to FIG. 1.

Each of the first arrangement 405, second arrangement 425 and third arrangement 445 produce substantially the same high contrast dot pattern 420.

A fourth arrangement 465 is depicted. The fourth arrangement corresponds to the first arrangement 405, and comprises a further set of radiation-emitting elements 470. Each element of the further set also is arranged with a pitch being an integer multiple of the first pitch. The further set of radiation-emitting elements 470 may correspond to the third set of radiation-emitting elements 190 of the embodiments of FIG. 1, wherein each element is arranged with a pitch d5 being an integer multiple of the first pitch.

The further set of radiation-emitting elements 470 is offset from the first set of radiation elements 415. In the example of the fourth arrangement 465, the further set of radiation-emitting elements 470 is offset from the first set of radiation elements 415 by a distance corresponding to half of the pitch of the MLA.

The first set of first radiation-emitting elements 415 and the further set of radiation-emitting elements 470 generate the dot pattern 475. As described above with reference to FIG. 3, each radiation-emitting element of the first set of first radiation-emitting elements 415 produces an overlapping dot pattern and each radiation-emitting element of the further set of radiation-emitting elements 415 produces a further overlapping dot pattern. As such, the overall dot pattern 475 comprises the overlapping dot pattern and the further overlapping dot pattern, and hence has twice as many dots as the structured light pattern 420 produced by the first, second and third arrangements 405, 425, 445. That is, having 2 regular grids of radiation-emitting elements, shifted compared to each other generates 2 non-overlapping grids of dots, increasing an overall dot count by a factor of 2.

A fifth arrangement 480 is also depicted, wherein the fifth arrangement 480 corresponds to the second arrangement 425, and comprises a further set of radiation-emitting elements 485 offset from the first set of first radiation-emitting elements 435 by a distance corresponding to half of the pitch of the MLA 430. Again, the further set of radiation-emitting elements 470 may correspond to the third set of radiation-emitting elements 190 of the embodiments of FIG. 1.

A sixth arrangement 490 is also depicted, wherein the sixth arrangement 490 corresponds to the third arrangement 445, and comprises a further set of radiation-emitting elements 495. Again, the further set of radiation-emitting elements 470 may correspond to the third set of radiation-emitting elements 190 of the embodiments of FIG. 1. The further set of radiation-emitting elements 495 is arranged such that each radiation-emitting element is aligned with a grid defined by the MLA 430, but offset relative to an alignment of the first set of first radiation-emitting elements and the grid by a distance corresponding to half of the pitch of the MLA 430

Each of the fourth arrangement 465, fifth arrangement 485 and sixth arrangement 490 produce substantially the same high contrast dot pattern 470.

In embodiments of the disclosure, the illumination apparatus 100 may comprise any of the first to sixth arrangements for generating the structured light pattern.

In some embodiments of the disclosure, the first set of first radiation-emitting elements, e.g. the radiation-emitting elements 130 of the illumination apparatus 100, may be provided as an array rotated at an angle θ relative to the MLA, as described below with reference to FIGS. 5 to 8.

Figure 5:
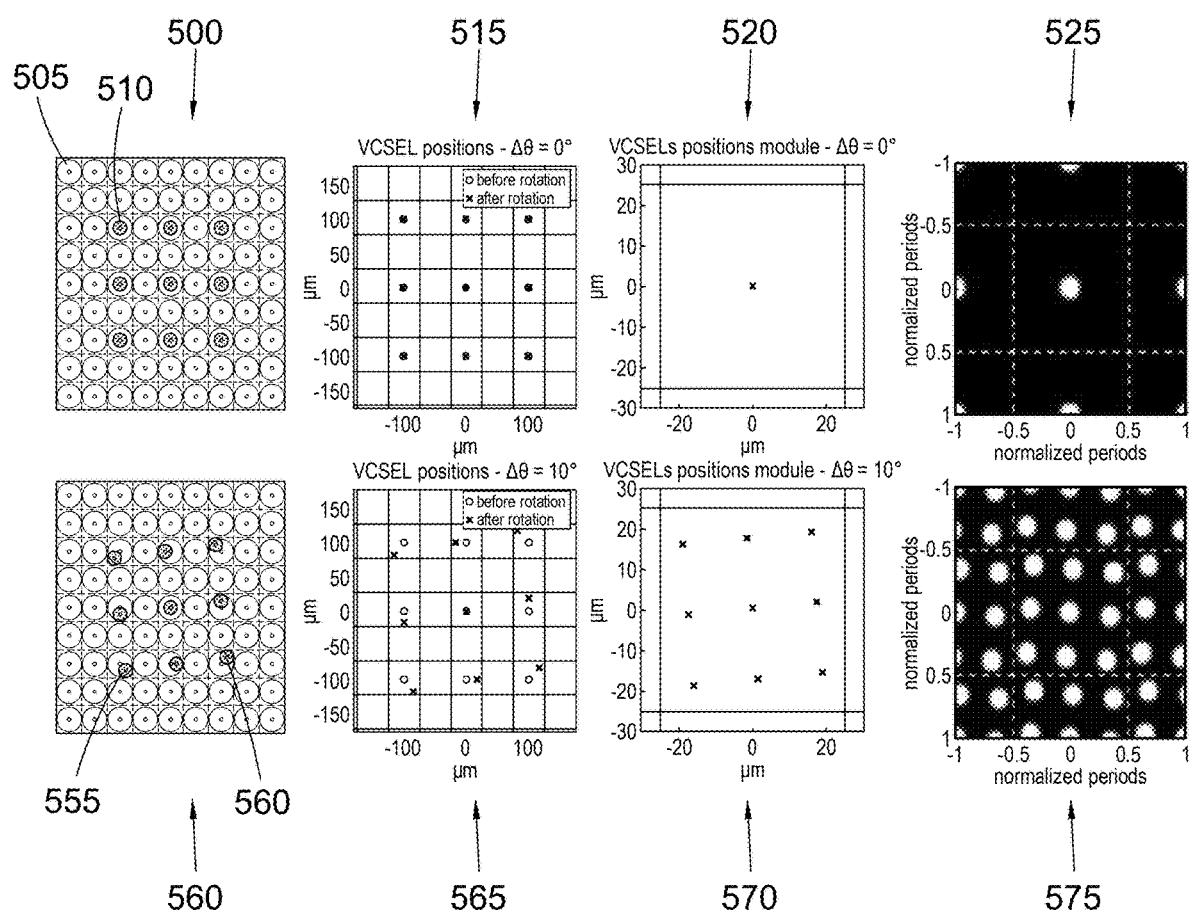
FIG. 5 depicts an effect of rotating an array of radiation-emitting elements at an angle θ relative to an MLA.

FIG. 5 depicts an effect of rotating an array of radiation-emitting elements at an angle θ relative to an MLA.

As described above with reference to FIG. 2, when an array of radiation-emitting elements is perfectly aligned angularly to an MLA, each radiation-emitting element of the array is in the same relative position compared to a lens of the MLA. For example, each radiation-emitting element is aligned to a center of each microlens, thereby generating a regular dot pattern, with one dot per microlens. In FIG. 5, a first arrangement 500 comprising an MLA 505 and a regular array of radiation-emitting elements 510 and is depicted. The MLA 505 may correspond to the MLA 120 of the illumination apparatus 100. The regular array or radiation-emitting elements 510 may correspond to the first set of first radiation-emitting elements 130 of the illumination apparatus 100. The first arrangement 500 is the same as the second arrangement 425 of FIG. 4, and is provided for purposes of example only.

A first chart 515 shows relative positions of each radiation-emitting element 510 to a corresponding microlens of the MLA 505 at a rotation angle θ of 0°. It can be seen that each radiation-emitting element 510 is positioned at a same position, e.g. a centre, relative to a corresponding lens of the microlens array. The MLA 505 may correspond to the MLA 120, 170 of the illumination apparatus of FIG. 1. The radiation-emitting elements 510 may correspond to the first set of first radiation-emitting elements 120, 180 of the illumination apparatus of FIG. 1.

For purposes of illustration, a second chart 520 depicts the relative position of each of the radiation-emitting elements 510 to a single microlens, which is represented as a single position. As described with reference to FIG. 2, a resultant dot pattern generated by each radiation-emitting element 510 perfectly overlaps to form a regular dot pattern 525 comprising a high-contrast pattern of dots.

In FIG. 5, a second arrangement 550 comprising an MLA 555 and a regular array of radiation-emitting elements 560 and is depicted. The MLA 555 may correspond to the MLA 120 of the illumination apparatus 100. The regular array or radiation-emitting elements 560 may correspond to the first set of first radiation-emitting elements 130 of the illumination apparatus 100.

A third chart 565 depicts relative positions of each radiation-emitting element 560 to a corresponding microlens of the MLA 555 at a rotation angle θ of 10°. It can be seen that each radiation-emitting element 560 is positioned at a different location relative to a centre of a corresponding lens of the microlens array.

For purposes of illustration, a fourth chart 570 depicts the relative position of each of the radiation-emitting elements 560 to a single microlens, where there are nine distinct positions represented. As described with reference to FIG. 3, a resultant dot pattern generated by each radiation-emitting element 560 does not overlap. In this example, each radiation-emitting element 560 generates its own dot pattern and a resultant dot pattern 575 has nine times as may dots as the dot pattern 525.

That is, after a rotation by an angle θ, the radiation-emitting elements 560 have different positions with respect to the lenses of the MLA 555. This generates extra dot patterns. The number of the generated patterns is equivalent to the number of different relative positions that the radiation-emitting elements 560 assume compared to the lenses in the MLA 555.

As described in more detail with reference to FIGS. 6 and 7, this effect may be used to change a shape of the projected dots using a regular array of radiation-emitting elements.

Figure 6:
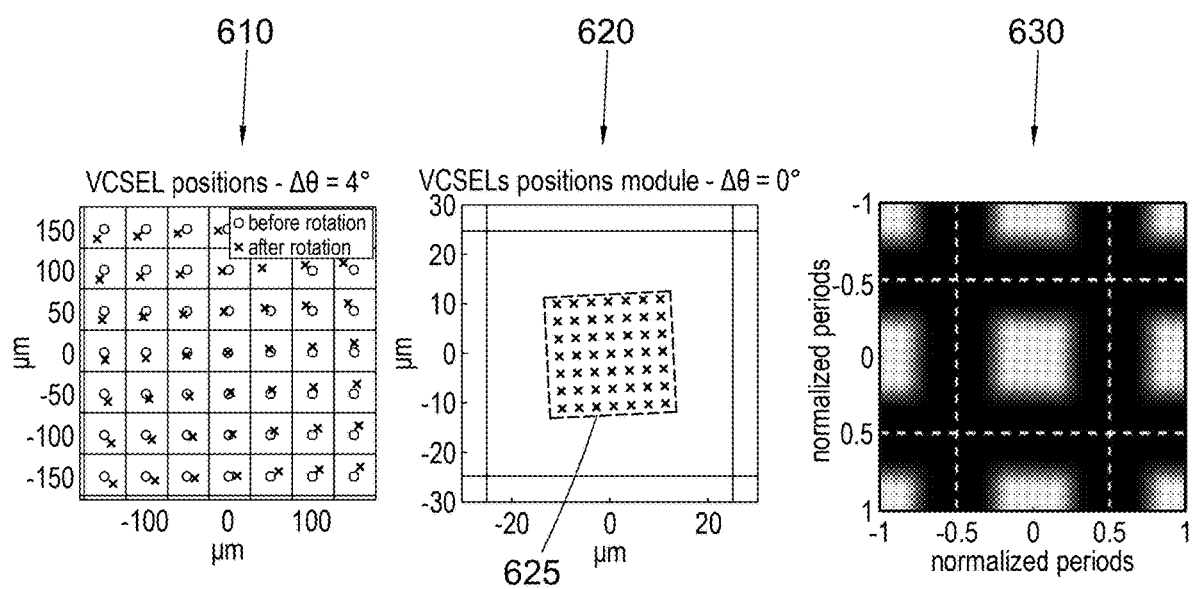
FIG. 6 depicts a rotation of an array of radiation-emitting elements relative to a periodic MLA.
Figure 7:
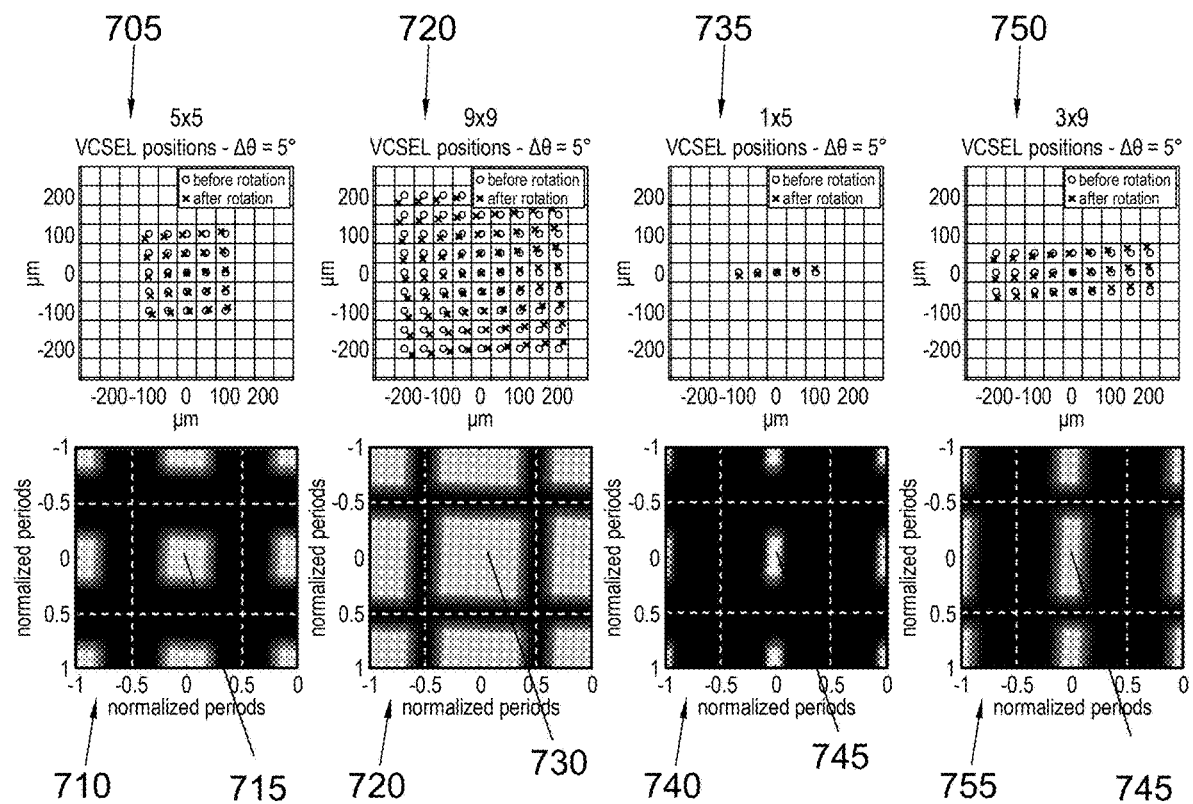
FIG. 7 depicts examples of selection of a particular size and shape of a pattern formed by dots by selecting an arrangement of the array of radiation-emitting elements.

FIG. 6 depicts a rotation of an array of radiation-emitting elements relative to a periodic MLA. The radiation-emitting elements may correspond to the first set of first radiation-emitting elements 130, 180 and, if implemented, the third set of radiation-emitting elements 190 of the illumination apparatus 100 of FIG. 1.

A first chart 610 depicts positions before and after rotation by an angle θ of 4° of a 7×7 array of radiation-emitting elements relative to a periodic MLA. It can be seen that, after rotation, each radiation-emitting element is positioned at a different location relative to a centre of a corresponding lens of the microlens array.

For purposes of illustration, a second chart 620 depicts the relative position of each of the radiation-emitting elements to a single microlens, where there are forty nine distinct positions represented and clustered in a substantially square pattern. As described with reference to FIG. 3, a resultant dot pattern generated by each radiation-emitting element does not overlap. The resultant forty-nine dot patterns are clustered to form a substantially square dot pattern 625, and shown by a simulated resultant structured light pattern 630.

A particular size and shape of a pattern formed by the dots, e.g. the square dot pattern 625, may be selected by adjusting the angle θ of rotation and alternatively or additionally by selecting an arrangement of the array of radiation-emitting elements. FIG. 7 provides some further examples.

A first chart 705 depicts positions before and after rotation by an angle θ of 5° of a 5×5 array of radiation-emitting elements relative to a periodic MLA. A second chart 710 shows a simulated resultant structured light pattern comprising a plurality of dot patterns are clustered to form substantially square dot patterns 715.

A third chart 720 depicts positions before and after rotation by an angle θ of 5° of a 9×9 array of radiation-emitting elements relative to a periodic MLA. A fourth chart 725 shows a simulated resultant structured light pattern comprising a plurality of dot patterns are clustered to form substantially square dot patterns 730 larger than the substantially square dot patterns 715.

A fifth chart 735 depicts positions before and after rotation by an angle θ of 5° of a 1×5 array of radiation-emitting elements relative to a periodic MLA. A sixth chart 740 shows a simulated resultant structured light pattern comprising a plurality of dot patterns are clustered to form substantially rectangular dot patterns 745.

A seventh chart 750 depicts positions before and after rotation by an angle θ of 5° of a 3×9 array of radiation-emitting elements relative to a periodic MLA. A eighth chart 755 shows a simulated resultant structured light pattern comprising a plurality of dot patterns are clustered to form substantially rectangular dot patterns 760 larger than the substantially rectangular dot patterns 745.

Figure 8:
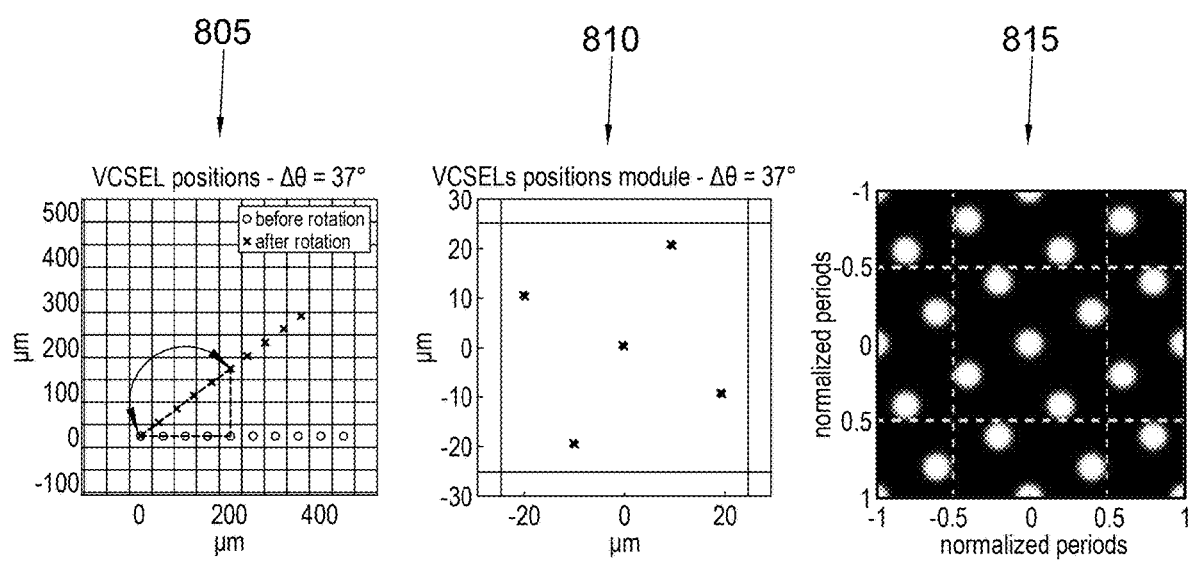
FIG. 8 depicts rotation of an array of radiation-emitting elements by particular angles to increase a number of dots in a high contrast dot pattern.

Furthermore, rotation by particular angles may be used to increase a number of dots in a high contrast dot pattern by a defined integer multiple, as explained with reference to FIG. 8.

A first graph 805 depicts positions before and after rotation by an angle θ of 37° of a 1×10 array of radiation-emitting elements relative to a periodic MLA represented by the grid. It can be seen that, before rotation, each radiation-emitting element is aligned with a centre of a microlens as represented by the grid. Upon rotation by approximately 37 degrees, the radiation-emitting elements are arranged on 5 distinct locations relative to a corresponding micro lens. This is shown in a second graph 810, which depicts the relative position of each of the radiation-emitting elements to a single microlens.

A simulation of a resultant dot pattern 815 is also shown.

After a rotation of a radiation-emitting element having original coordinates $(x_v, y_v)$ by an angle θ, a new position of the radiation-emitting element $(X_{vrot}, Y_{vrot})$ can be defined as:

$$x_{vrot} = x_v \cos(\theta) - y_v \sin(\theta) \quad \text{Equation (6)}$$

$$y_{vrot} = x_v \sin(\theta) + y_v \cos(\theta) \quad \text{Equation (7)}$$

For the case depicted in the first graph 805, wherein $x_v=(X-1)d$, X being an integer, d being the pitch and $y_v=0$, the coordinate for any of the radiation-emitting elements may be represented as:

$$x_{vrot} = (X-1)d\cos(\theta) \quad \text{Equation (8)}$$

$$y_{vrot} = (X-1)d\sin(\theta) \quad \text{Equation (9)}$$

A condition for a particular radiation-emitting element to exhibit overlapping coordinates with one of the original coordinates may be defined by:

$$A d = (X-1)d\cos(\theta) \quad \text{Equation (10)}$$

$$B d = (X-1)d\sin(\theta) \quad \text{Equation (11)}$$

which can be reformulated as:

$$(A^2 + B^2)d^2 = (X-1)^2 d^2 \left(\cos^2(\theta) + \sin^2(\theta)\right) \quad \text{Equation (12)}$$

$$A^2 + B^2 = (X-1)^2 \quad \text{Equation (4)}$$

With all of A, B and X as positive integers, Equation (4) is only satisfied by particular sets of numbers, known as Pythagorean triples, as exemplified in Table 1 below. In Table 1, values 'A' and 'B' are interchangeable, and the value 'X−1' is representative of a number of non-overlapping patterns generated, e.g. the multiple increase in number of dots after the rotation. The angle θ of rotation corresponding to such Pythagorean triples is defined by Equation (3).

TABLE 1

Pythagorean triplets and associated angles of rotation

| A | B | X-1 | θ = tan⁻¹(B/A) |
|---|---|-----|----------------|
| 4 | 3 | 5 | 36.8699° |
| 12 | 5 | 13 | 22.6199° |
| 15 | 8 | 17 | 28.0725° |
| 24 | 7 | 25 | 16.2602° |
| 21 | 20 | 29 | 43.6028° |

Thus, in some embodiments, the first set of first radiation-emitting elements 130, 180 and, if implemented, the third set of radiation-emitting elements 190 of the illumination apparatus 100, 150, are provided as an array rotated at an angle θ relative to the MLA 120, 180, wherein the angle θ is defined by Equation (3) as described above.

FIGS. 9 to 12 relate to configurations of the second set of second radiation-emitting elements of the illumination apparatus 100, 150. As described above, in embodiments of the illumination apparatus 100, 150, the second set of second radiation-emitting elements 135, 185 is arranged with a third pitch d3 being a non-integer multiple of the first pitch d1 in at least a first direction and configured to generate, in cooperation with the MLA, a pattern of lines or a beam for flood illumination.

Figure 9:
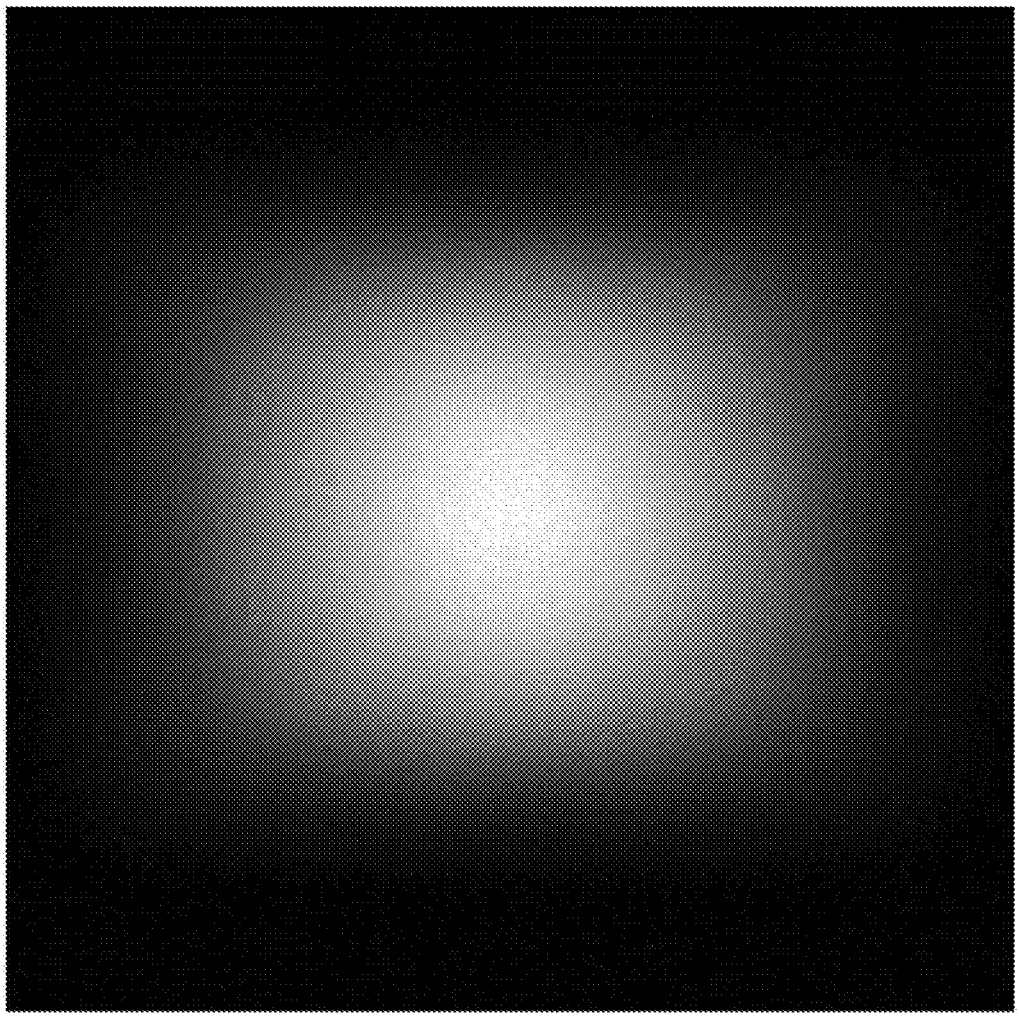
FIG. 9 depicts an example of a projected beam for flood illumination.

In some embodiments, the second set of second radiation-emitting elements 135, 185 illumination apparatus 100, 150 is an array of n×n radiation-emitting elements. In embodiments, the third pitch may correspond to both x and y direction, e.g. a first direction and a second orthogonal direction, both aligned with a grid defined by the MLA 120, 170. That is, in some embodiments equation (1) defines the pitch in both x and y directions. This results in several projected dot patterns, shifted by L/[(n+1)/n], with L being a period of the basic dot pattern, such that all of the dot patterns collectively provide a beam for flood illumination. Projection of such a beam is shown in FIG. 9.

In some embodiments, the second set of second radiation-emitting elements 135, 185 illumination apparatus 100, 150 is an array of n×m radiation-emitting elements. In such embodiments, the third pitch may correspond to both x and y direction, e.g. a first direction and a second orthogonal direction, both aligned with a grid defined by the MLA 120, 170. That is, in some embodiments equation (1) defines the pitch in both x and y directions, wherein 'm' instead of 'n' is used in equation (1) for the y-direction. Again, this results in several projected dot patterns, shifted by L/[(n±1)/n] in the x-direction and L/[(m±1)/m] in the y-direction, with L being a period of the basic dot pattern, such that all of the dot patterns collectively provide a beam for flood illumination. Projection of such a beam is shown in FIG. 9.

Figure 10:
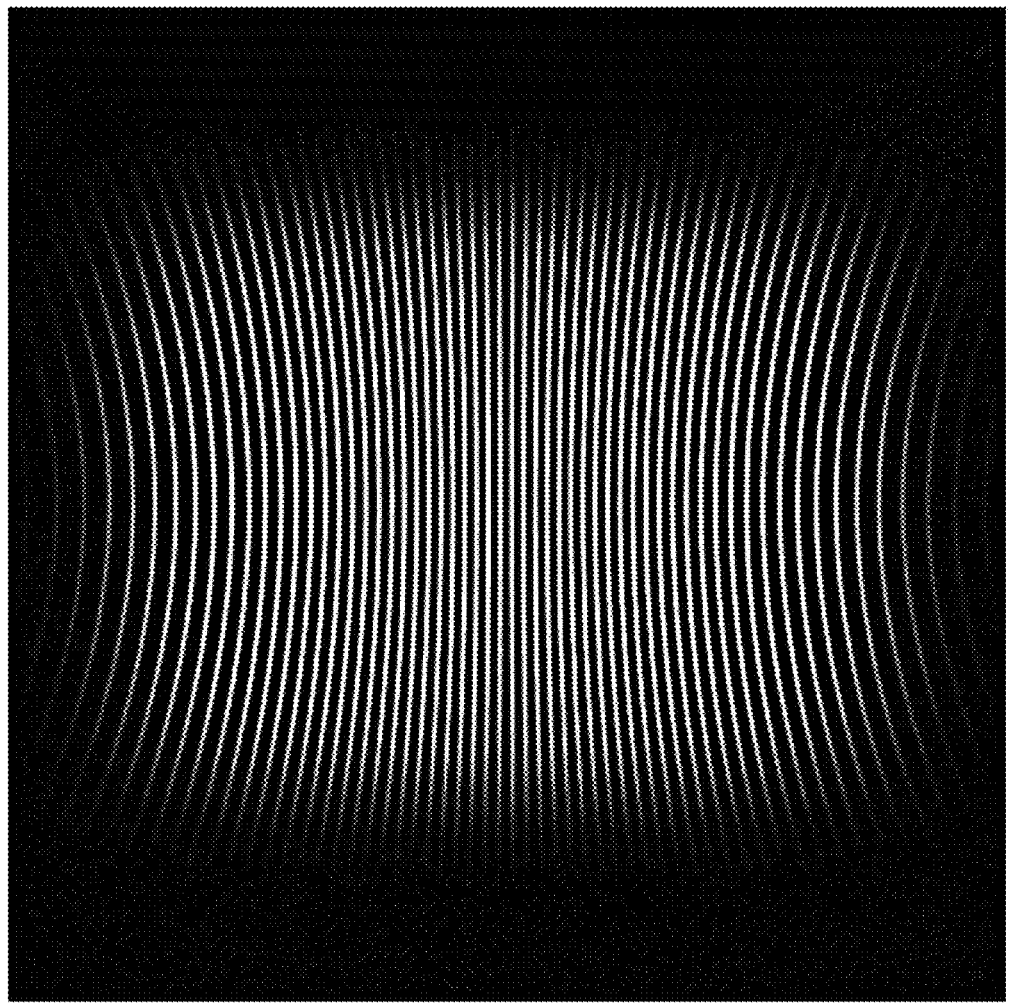
FIG. 10 depicts an example of a projected pattern of lines.

In some embodiments, the second set of second radiation-emitting elements 135, 185 of the illumination apparatus 100, 150 is provided as an array of radiation-emitting elements with a fourth pitch d4 being an integer multiple of the first pitch d1 in a second direction orthogonal to the first direction, e.g. in the y-direction, and configured to generate, in cooperation with the MLA, the pattern of lines. Projection of such a pattern is shown in FIG. 10.

Figure 11:
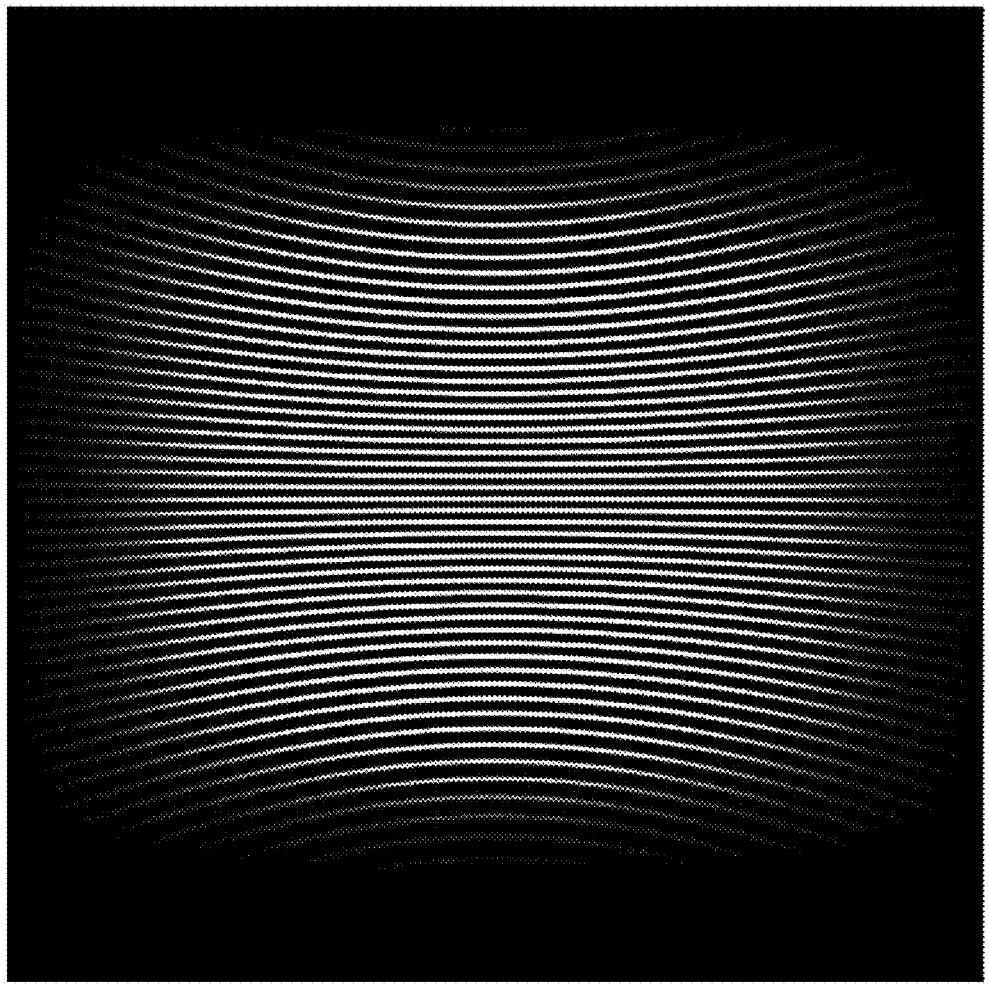
FIG. 11 depicts a further example of a projected pattern of lines.
Figure 12:
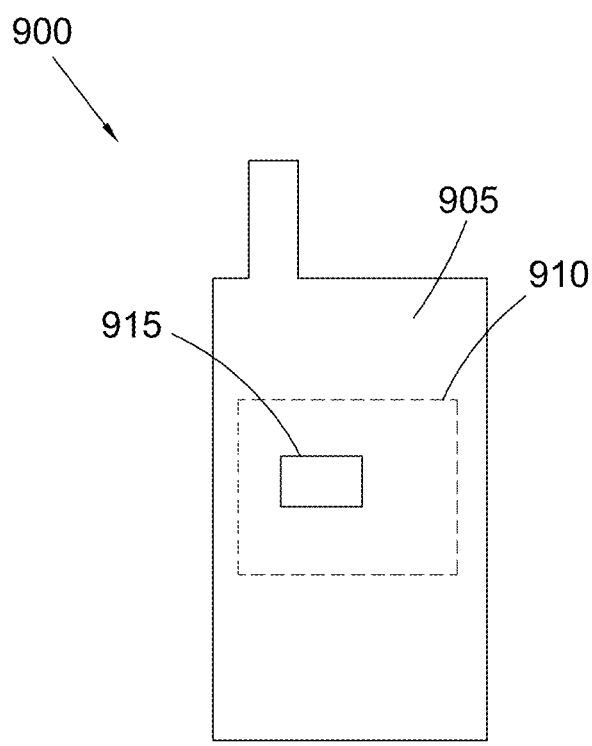
FIG. 12 depicts a device comprising an illumination apparatus according to an embodiment of the disclosure.

Similarly, if the second set of second radiation-emitting elements 135, 185 of the illumination apparatus 100, 150 is provided as an array of radiation-emitting elements with a fourth pitch d4 being an integer multiple of the first pitch d1 in a second direction orthogonal to the first direction, wherein the second direction is the x-direction, a projected pattern may correspond to FIG. 11.

FIG. 11 depicts a device 900 comprising an illumination apparatus 910 according to an embodiment of the disclosure.

For purposes of example only, the device 900 is a smartphone.

The illumination apparatus 910 may be an illumination apparatus 100, 150 as described above.

The device 900 comprises a housing 905 configured to house various components of the device, including the illumination apparatus 910. The illumination apparatus 910 is configured to emit the structured light pattern and the pattern of lines or the beam for flood illumination through a single aperture 915 in the housing 905. This is in contrast to other prior art devices, wherein either a first aperture is provided for emitting the structured light pattern and a second aperture is provided for emitting the beam for flood illumination, or a much larger aperture is provided for emission of both the structured light pattern and the beam for flood illumination.

Although the disclosure has been described in terms of embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

| REFERENCE NUMERALS | |
|---|---|
| 100 | illumination apparatus |
| 105 | first substrate |
| 110 | spacer |
| 115 | second substrate |
| 120 | MLA |
| 125 | third substrate |
| 130 | first set of first radiation-emitting elements |
| 135 | second set of second radiation-emitting elements |
| 150 | illumination apparatus |
| 155 | first substrate |
| 160 | spacer |
| 165 | second substrate |
| 170 | MLA |
| 175 | third substrate |
| 180 | first set of first radiation-emitting elements |
| 185 | second set of second radiation-emitting elements |
| 190 | third set of radiation-emitting elements |
| 205 | radiation-emitting element |
| 210 | radiation-emitting element |
| 215 | MLA |
| 220 | dot pattern |
| 305 | radiation-emitting element |
| 310 | radiation-emitting element |
| 315 | MLA |
| 320 | dot pattern |
| 405 | first arrangement |
| 410 | MLA |
| 415 | first set of first radiation-emitting elements |
| 420 | structured light pattern |
| 425 | second arrangement |
| 430 | MLA |
| 435 | radiation-emitting elements |
| 445 | third arrangement |
| 450 | MLA |
| 455 | radiation-emitting elements |
| 465 | fourth arrangement |
| 470 | radiation-emitting elements |
| 475 | dot pattern |
| 480 | fifth arrangement |
| 485 | radiation-emitting elements |
| 490 | sixth arrangement |
| 495 | radiation-emitting elements |
| 500 | first arrangement |
| 505 | MLA |
| 510 | radiation-emitting elements |
| 515 | first chart |
| 520 | second chart |
| 525 | dot pattern |
| 550 | second arrangement |
| 555 | MLA |
| 560 | radiation-emitting elements |
| 565 | third chart |
| 570 | fourth chart |
| 575 | dot pattern |
| 610 | first chart |
| 620 | second chart |
| 625 | square dot pattern |
| 630 | structured light pattern |
| 705 | first chart |
| 710 | second chart |
| 715 | dot patterns |
| 720 | third chart |
| 725 | fourth chart |
| 730 | square dot patterns |
| 735 | fifth chart |
| 740 | sixth chart |
| 745 | rectangular dot patterns |
| 750 | seventh chart |
| 755 | eighth chart |
| 760 | dot patterns |

| REFERENCE NUMERALS | |
| --- | --- |
| 805 | first graph |
| 810 | second graph |
| 815 | dot pattern |
| 900 | device |
| 905 | housing |
| 910 | illumination apparatus |
| 915 | aperture |
| d1 | first pitch |
| d2 | second pitch |
| d3 | third pitch |
| d4 | fourth pitch |
| d5 | fifth pitch |

The invention claimed is:

1. An illumination apparatus comprising:
a periodic microlens array (MLA) comprising microlenses arranged with a first pitch d1 in a first direction;
a first set of first radiation-emitting elements arranged with a second pitch d2 being an integer multiple of the first pitch d1 and configured to generate, in cooperation with the MLA, a structured light pattern; and
a second set of second radiation-emitting elements arranged with a third pitch d3 being a non-integer multiple of the first pitch d1 in at least the first direction and configured to generate, in cooperation with the MLA, a pattern of lines or a beam for flood illumination,
wherein the third pitch d3 is defined by the equation:

$$d3 = d1(n +/- 1)/n$$

wherein 'n' corresponds to an amount of radiation-emitting elements in the second set of second radiation-emitting elements in the first direction.

2. The illumination apparatus of claim 1, wherein the second set of second radiation-emitting elements is arranged with a fourth pitch d4 being a non-integer multiple of the first pitch d1 in a second direction orthogonal to the first direction, and configured to generate, in cooperation with the MLA, the beam for flood illumination.

3. The illumination apparatus of claim 2, wherein the fourth pitch d4 is defined by the equation:

$$d4 = d1(m +/- 1)/m.$$

wherein 'm' corresponds to an amount of radiation-emitting elements in the second set of second radiation-emitting elements in the second direction.

4. The illumination apparatus of claim 1, wherein the first set of first radiation-emitting elements are provided as an array rotated at an angle θ relative to the MLA, wherein the angle is one of: 16.3°; 22.6°; 28.1°; 36.7°; 43.6°; 46.4°; 53.3°; 61.9°; 67.4° or 73.7°.

5. The illumination apparatus of claim 1, wherein the first set of first radiation-emitting elements are provided as an array rotated at an angle θ relative to the MLA, wherein the angle θ is defined by:

$$\theta = \tan^{-1}(B/A)$$

wherein:

$$A^2 + B^2 = (X - 1)^2$$

and wherein A, B and X are integers.

6. The illumination apparatus of claim 1, wherein the first set of first radiation-emitting elements are arranged as an n×n square array rotated at a non-90 degree angle θ relative to the MLA, and configured to generate, in cooperation with the MLA, a structured light pattern comprising dots grouped to form a pattern of squares.

7. The illumination apparatus of claim 1, wherein the first set of first radiation-emitting elements are arranged as an m×n square array rotated at a non-90 degree angle θ relative to the MLA, and configured to generate, in cooperation with the MLA, a structured light pattern comprising dots grouped to form a pattern of rectangles.

8. The illumination apparatus of claim 6, wherein the angle θ is less than 5 degrees.

9. The illumination apparatus of claim 1, wherein the first set of first radiation-emitting elements and the second set of second radiation-emitting elements are interlaced as a single array of radiation-emitting elements on a substrate.

10. The illumination apparatus of claim 1, wherein each radiation-emitting element is a Vertical Cavity Surface Emitting Laser (VCSEL).

11. The illumination apparatus of claim 1, wherein the first and second set of second radiation-emitting elements are at a distance D1 from the MLA, wherein:

$$P1^2 = 2*L1*D1/N1$$

and wherein N1 is an integer, L1 is a wavelength of radiation emitted by the radiation-emitting elements and P1 is a pitch of the MLA (120, 170).

12. The illumination apparatus of claim 1, wherein the first set of first radiation-emitting elements and the second set of second radiation-emitting elements are configured to be enabled independently.

13. An illumination apparatus comprising:
a periodic microlens array (MLA) comprising microlenses arranged with a first pitch d1 in a first direction;
a first set of first radiation-emitting elements arranged with a second pitch d2 being an integer multiple of the first pitch d1 and configured to generate, in cooperation with the MLA, a structured light pattern; and
a second set of second radiation-emitting elements arranged with a third pitch d3 being a non-integer multiple of the first pitch d1 in at least the first direction and configured to generate, in cooperation with the MLA, a pattern of lines or a beam for flood illumination
wherein the second set of second radiation-emitting elements is arranged with a fourth pitch d4 being an integer multiple of the first pitch d1 in a second direction orthogonal to the first direction, and configured to generate, in cooperation with the MLA, the pattern of lines.

14. An illumination apparatus comprising:
a periodic microlens array (MLA) comprising microlenses arranged with a first pitch d1 in a first direction;
a first set of first radiation-emitting elements arranged with a second pitch d2 being an integer multiple of the first pitch d1 and configured to generate, in cooperation with the MLA, a structured light pattern; and a second set of second radiation-emitting elements arranged with a third pitch d3 being a non-integer multiple of the first pitch d1 in at least the first direction and configured to generate, in cooperation with the MLA, a pattern of lines or a beam for flood illumination a third set of radiation-emitting elements arranged with a fifth pitch d5 being an integer multiple of the first pitch d1 and configured to generate, in cooperation with the MLA, a structured light pattern, wherein:

the radiation emitting elements of the first set are aligned with a grid having the first pitch d1; and the radiation emitting elements of the third set are offset from the grid.

15. The illumination apparatus of claim 14, wherein the radiation emitting elements of the third set of radiation-emitting elements are offset from the grid by a distance corresponding to half of the first pitch d1.

* * * * *